(12) United States Patent
Messick et al.

(10) Patent No.: US 11,237,611 B2
(45) Date of Patent: Feb. 1, 2022

(54) SYSTEMS AND METHODS FOR DETERMINING REAL-TIME WORKLOAD POWER SUPPLY UNITS AND ENHANCED REDUNDANCY REPORTING

(71) Applicant: Dell Products L.P., Round Rock, TX (US)

(72) Inventors: Doug E. Messick, Austin, TX (US); Aaron M. Rhinehart, Georgetown, TX (US)

(73) Assignee: Dell Products L.P., Round Rock, TX (US)

( * ) Notice: Subject to any disclaimer, the term of this patent is extended or adjusted under 35 U.S.C. 154(b) by 34 days.

(21) Appl. No.: 16/870,551

(22) Filed: May 8, 2020

(65) Prior Publication Data

US 2021/0349515 A1  Nov. 11, 2021

(51) Int. Cl.
| | |
|---|---|
| *G06F 1/30* | (2006.01) |
| *G06F 11/07* | (2006.01) |
| *G06F 1/28* | (2006.01) |
| *G06F 11/30* | (2006.01) |
| *G06F 11/34* | (2006.01) |

(52) U.S. Cl.
CPC ............. *G06F 1/30* (2013.01); *G06F 1/28* (2013.01); *G06F 11/0751* (2013.01); *G06F 11/0772* (2013.01); *G06F 11/3062* (2013.01); *G06F 11/3442* (2013.01)

(58) Field of Classification Search
CPC .......... G06F 1/30; G06F 1/28; G06F 11/0751; G06F 11/0772; G06F 11/3062; G06F 11/3442; G06F 1/263
See application file for complete search history.

(56) References Cited

U.S. PATENT DOCUMENTS

| | | | |
|---|---|---|---|
| 2005/0008146 A1* | 1/2005 | Chheda | G06F 1/263 379/413 |
| 2007/0220291 A1* | 9/2007 | Stufflebeam | G06F 1/3203 713/320 |
| 2008/0244283 A1* | 10/2008 | Elliott | G06F 1/305 713/300 |
| 2010/0038963 A1* | 2/2010 | Shetty | G06F 1/28 307/62 |
| 2010/0064150 A1* | 3/2010 | Higuchi | G06F 1/30 713/300 |
| 2010/0088533 A1* | 4/2010 | Benhase | G06F 1/28 713/340 |

(Continued)

*Primary Examiner* — Aurel Prifti
(74) *Attorney, Agent, or Firm* — Jackson Walker L.L.P.

(57) ABSTRACT

An information handling system may include a power system comprising a plurality of power supply units and a management controller communicatively coupled to the plurality of power supply units. The management controller may be configured to monitor real-time direct current (DC) power consumption by components of the information handling system, determine an effective output capacity of each of the plurality of power supply units, and based on the real-time DC power consumption and effective output capacity of each of the plurality of power supply units, determine a real-time power supply unit workload attribute that indicates a number of the plurality of power supply units required to provide the real-time DC power consumption.

12 Claims, 3 Drawing Sheets

(56) References Cited

U.S. PATENT DOCUMENTS

| | | | |
|---|---|---|---|
| 2011/0025129 A1* | 2/2011 | Humphrey | G06F 1/3203 307/64 |
| 2011/0040993 A1* | 2/2011 | Chang | G06F 1/3203 713/320 |
| 2011/0256891 A1* | 10/2011 | Soliman | H04W 68/12 455/458 |
| 2011/0273971 A1* | 11/2011 | Chan | G06F 1/28 369/47.5 |
| 2011/0302435 A1* | 12/2011 | Fang | H04W 52/0277 713/320 |
| 2012/0079299 A1* | 3/2012 | Cepulis | G06F 1/3206 713/320 |
| 2012/0110350 A1* | 5/2012 | Horvath | G06F 1/263 713/300 |
| 2012/0296583 A1* | 11/2012 | Cong | G06F 11/325 702/58 |
| 2012/0311368 A1* | 12/2012 | Zhang | G06F 11/3055 713/340 |
| 2013/0179718 A1* | 7/2013 | Jau | G06F 1/305 713/340 |
| 2014/0132070 A1* | 5/2014 | Kuan | H02J 9/061 307/29 |
| 2014/0136866 A1* | 5/2014 | Kuan | G06F 1/3296 713/320 |
| 2015/0121113 A1* | 4/2015 | Ramamurthy | H02J 7/00712 713/340 |
| 2015/0355699 A1* | 12/2015 | Castro-Leon | G06F 1/324 713/322 |
| 2015/0370301 A1* | 12/2015 | Bolan | G06F 1/30 713/322 |
| 2016/0282892 A1* | 9/2016 | Saavedra | G05B 15/02 |
| 2017/0010652 A1* | 1/2017 | Huang | G06F 11/0751 |
| 2017/0052582 A1* | 2/2017 | Nguyen | G06F 1/30 |
| 2017/0255247 A1* | 9/2017 | Ardanaz | G06F 1/266 |
| 2017/0329383 A1* | 11/2017 | Bailey | G06F 1/3234 |
| 2018/0059754 A1* | 3/2018 | Shaikh | H02J 1/10 |
| 2018/0116070 A1* | 4/2018 | Broadbent | H02J 4/00 |
| 2018/0173295 A1* | 6/2018 | Cross | G06F 1/3287 |
| 2018/0341307 A1* | 11/2018 | Shaikh | G06F 1/266 |
| 2019/0097455 A1* | 3/2019 | Gu | G06F 1/30 |
| 2019/0235599 A1* | 8/2019 | Yuasa | G06F 1/30 |
| 2019/0391626 A1* | 12/2019 | Wang | G06F 1/3206 |
| 2020/0004282 A1* | 1/2020 | Choi | H01L 28/10 |
| 2020/0315054 A1* | 10/2020 | Shen | H05K 7/1492 |
| 2021/0294406 A1* | 9/2021 | Broadbent | G06F 1/3228 |

* cited by examiner

SYSTEMS AND METHODS FOR DETERMINING REAL-TIME WORKLOAD POWER SUPPLY UNITS AND ENHANCED REDUNDANCY REPORTING

TECHNICAL FIELD

The present disclosure relates in general to information handling systems, and more particularly to systems and methods for determining real-time workload power supply units and enhanced redundancy reporting.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

An information handling system may include one or more power supply units for providing electrical energy to components of the information handling system. At the point of sale, purchasers of monolithic and modular servers often purchase a power supply configuration to meet the purchaser's workload and redundancy requirements. Using existing approaches, there are limited mechanisms that enable the purchaser or user to analyze a deployed server concerning the power supply unit configuration and datacenter power architecture and to predict system behavior during power faults. For example, existing tools may not provide insight regarding how a workload power consumption may fit with the purchaser's deployed servers and/or how much throttling of power consumption might be expected in a typical fault scenario.

Another problem is that a single power supply unit failure may trigger critical log messages which include "PSU off due to low input voltage" and "redundancy is lost". The "redundancy is lost" error may be based only on power budgeting and may be issued whether the actual power consumption of the system warrants the critical log message or not.

SUMMARY

In accordance with the teachings of the present disclosure, the disadvantages and problems associated with existing approaches to power management may be reduced or eliminated.

In accordance with embodiments of the present disclosure, an information handling system may include a power system comprising a plurality of power supply units and a management controller communicatively coupled to the plurality of power supply units. The management controller may be configured to monitor real-time direct current (DC) power consumption by components of the information handling system, determine an effective output capacity of each of the plurality of power supply units, and based on the real-time DC power consumption and effective output capacity of each of the plurality of power supply units, determine a real-time power supply unit workload attribute that indicates a number of the plurality of power supply units required to provide the real-time DC power consumption.

In accordance with these and other embodiments of the present disclosure, a method may include monitoring real-time direct current (DC) power consumption by components of an information handling system, determining an effective output capacity of each of a plurality of power supply units of the information handling system, and based on the real-time DC power consumption and effective output capacity of each of the plurality of power supply units, determining a real-time power supply unit workload attribute that indicates a number of the plurality of power supply units required to provide the real-time DC power consumption.

In accordance with these and other embodiments of the present disclosure, an article of manufacture may include a non-transitory computer-readable medium and computer-executable instructions carried on the computer-readable medium, the instructions readable by a processor, the instructions, when read and executed, for causing the processor to monitor real-time direct current (DC) power consumption by components of an information handling system, determine an effective output capacity of each of a plurality of power supply units of the information handling system, and based on the real-time DC power consumption and effective output capacity of each of the plurality of power supply units, determine a real-time power supply unit workload attribute that indicates a number of the plurality of power supply units required to provide the real-time DC power consumption.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
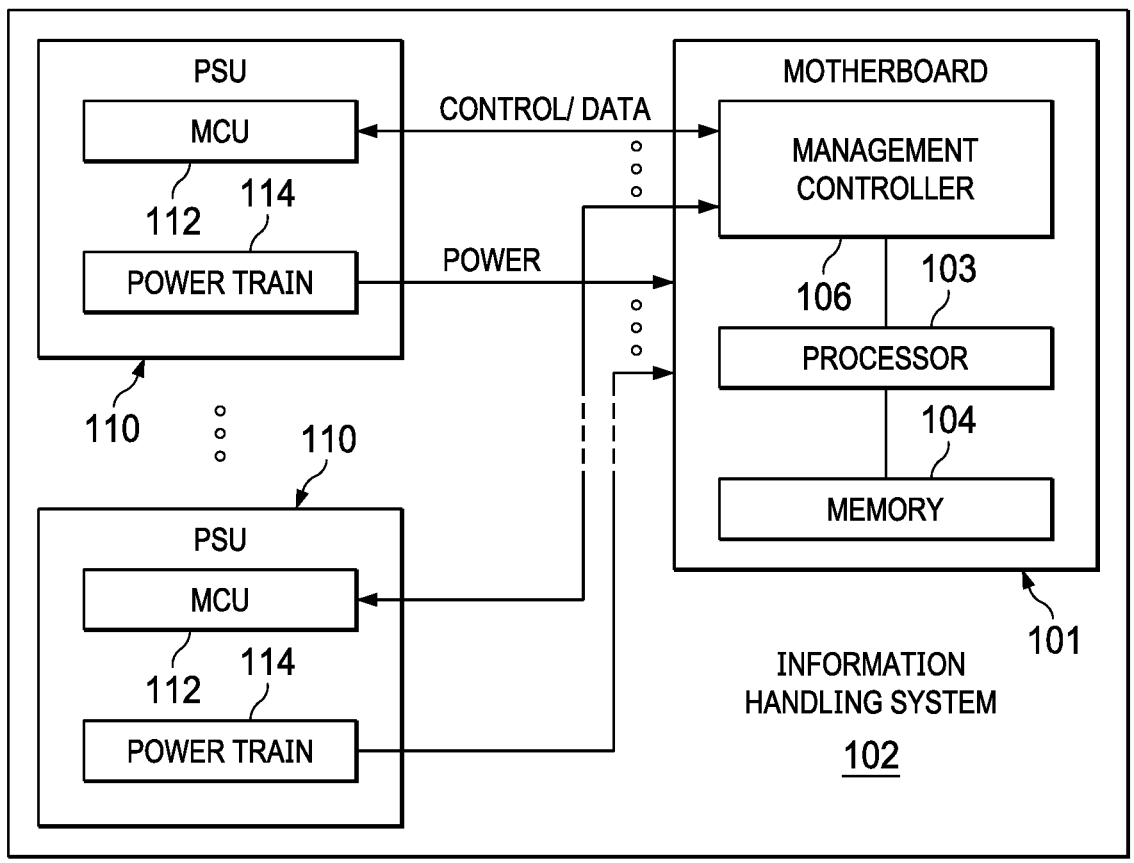
FIG. 1 illustrates a block diagram of an example information handling system, in accordance with embodiments of the present disclosure.
Figure 2:
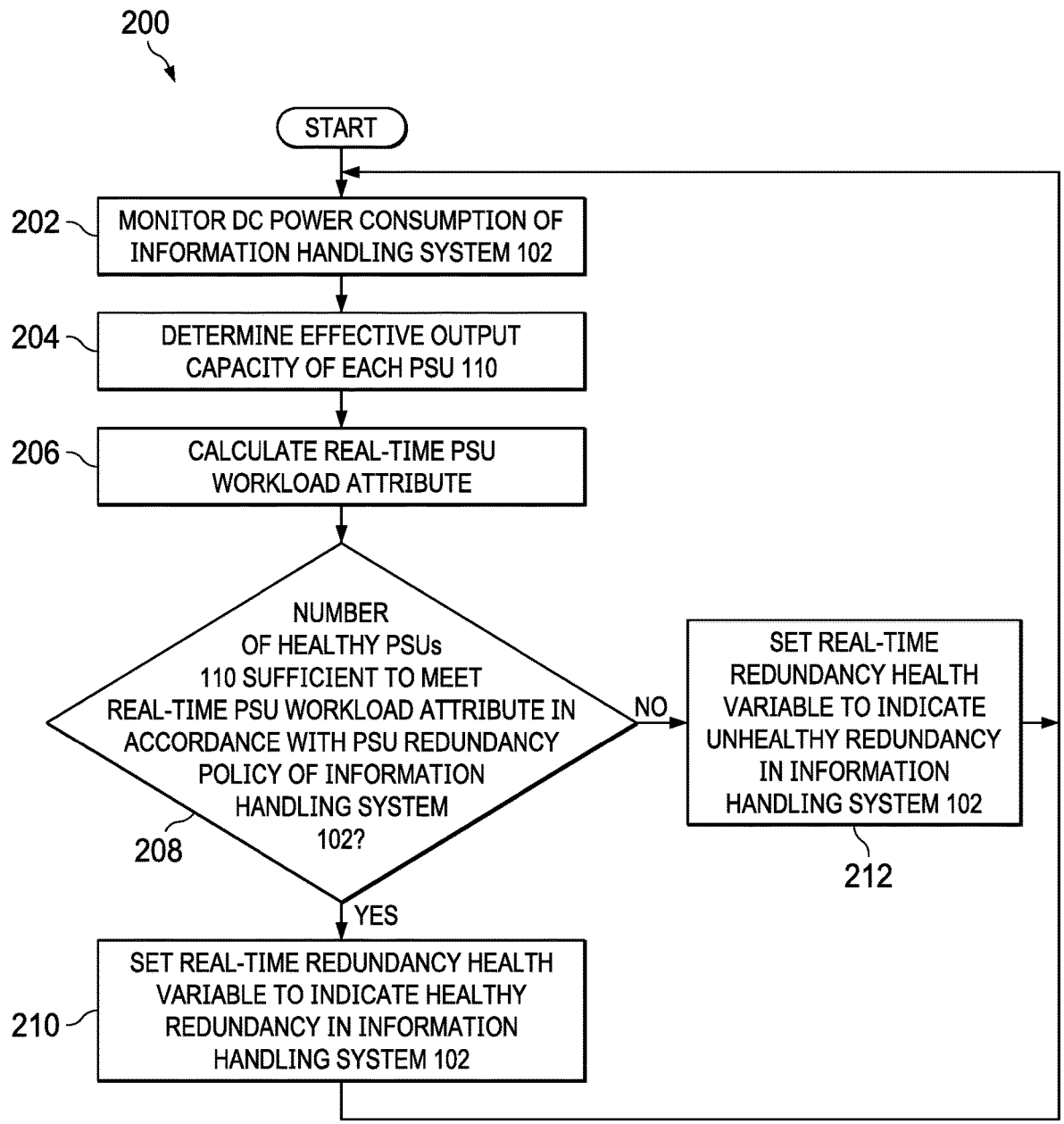
FIG. 2 illustrates a flow chart of an example method for determination of real-time redundancy based on workload, in accordance with embodiments of the present disclosure.
Figure 3:
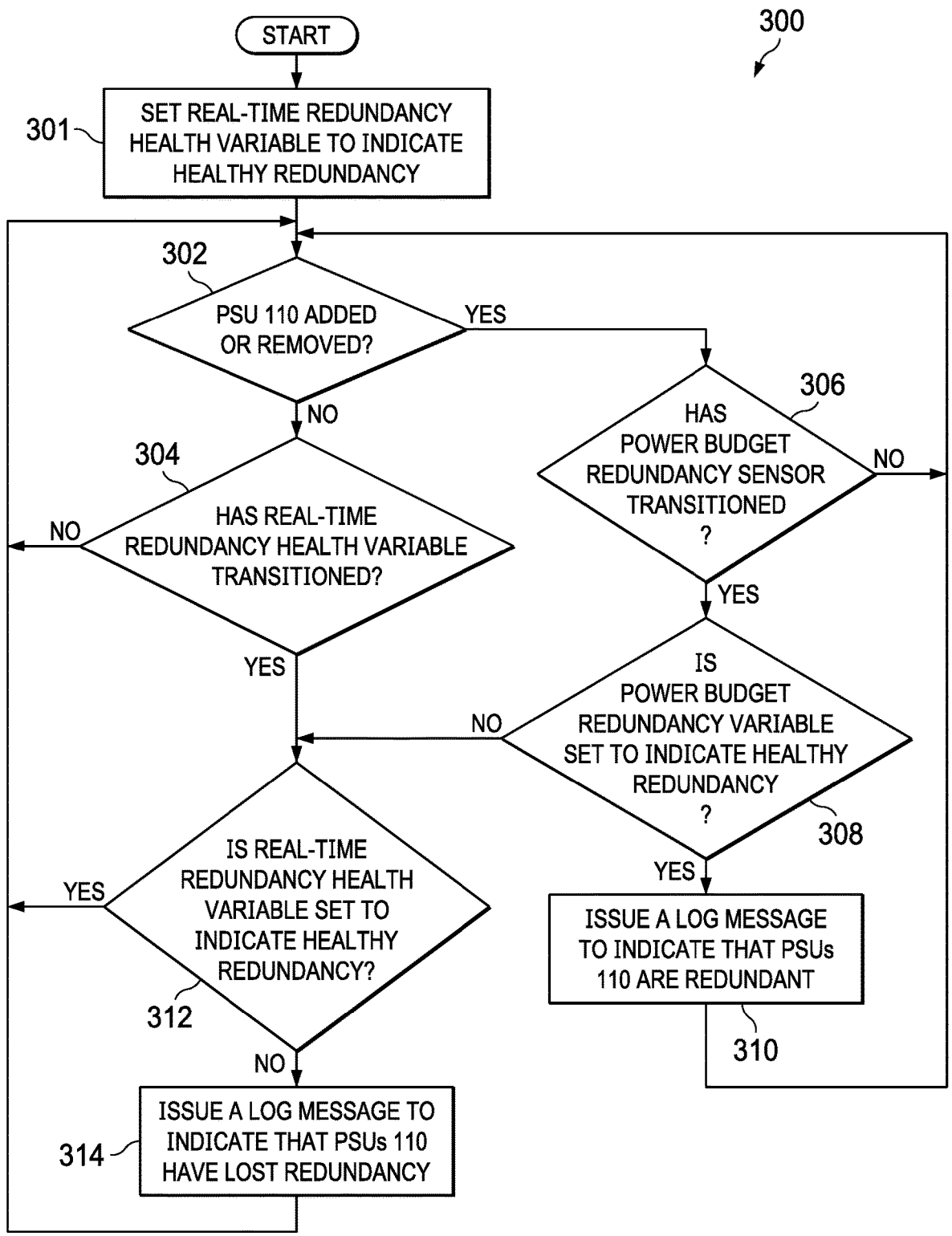
FIG. 3 illustrates a flow chart of an example method for critical log suppression, in accordance with embodiments of the present disclosure.

Preferred embodiments and their advantages are best understood by reference to FIGS. 1-3, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal data assistant (PDA), a consumer electronic device, a network storage device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, power supplies, air movers (e.g., fans and blowers) and/or any other components and/or elements of an information handling system.

FIG. 1 illustrates a block diagram of an example information handling system 102. As depicted, information handling system 102 may include a plurality of power supply units (PSUs) 110, a motherboard 101, and one or more other information handling resources.

Motherboard 101 may include a circuit board configured to provide structural support for one or more information handling resources of information handling system 102 and/or electrically couple one or more of such information handling resources to each other and/or to other electric or electronic components external to information handling system 102. As shown in FIG. 1, motherboard 101 may include a processor 103, memory 104, a management controller 106, and one or more other information handling resources.

Processor 103 may comprise any system, device, or apparatus operable to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may comprise any system, device, or apparatus operable to retain program instructions or data for a period of time. Memory 104 may comprise random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to information handling system 102 is turned off.

Management controller 106 may be configured to provide out-of-band management facilities for management of information handling system 102. Such management may be made by management controller 106 even if information handling system 102 is powered off or powered to a standby state. Management controller 106 may include a processor, memory, an out-of-band network interface separate from and physically isolated from an in-band network interface of information handling system 102, and/or other embedded information handling resources. In certain embodiments, management controller 106 may include or may be an integral part of a baseboard management controller (BMC) or a remote access controller (e.g., a Dell Remote Access Controller or Integrated Dell Remote Access Controller). In other embodiments, management controller 106 may include or may be an integral part of a chassis management controller (CMC). In yet other embodiments, management controller 106 may include or may be an integral part of an enclosure controller (EC). In some embodiments, management controller 106 may be configured to communicate with a PSU 110 to communicate control and/or telemetry data between management controller 106 and PSU 110.

A PSU 110 may include any system, device, or apparatus configured to supply electrical current to one or more information handling resources of information handling system 102. As shown in FIG. 1, PSU 110 may include a microcontroller unit (MCU) 112, and a power train 114.

MCU 112 may comprise a microprocessor, DSP, ASIC, FPGA, EEPROM, or any combination thereof, or any other device, system, or apparatus for controlling operation of its associated PSU 110. As such, MCU 112 may comprise firmware, logic, and/or data for controlling functionality of such PSU 110.

Power train 114 may include any suitable system, device, or apparatus for converting electrical energy received by PSU 110 (e.g., a 120-volt alternating current voltage waveform) into electrical energy usable to information handling resources of information handling system 102 (e.g., 12-volt direct current voltage source). In some embodiments, power train 114 may comprise a rectifier. In these and other embodiments, power train 114 may comprise a voltage regulator (e.g., a multi-phase voltage regulator).

In addition to motherboard 101, processor 103, memory 104, management controller 106, and PSU 110, information handling system 102 may include one or more other information handling resources. For example, in some embodiments, information handling system 102 may include one or more other sensors for sensing environmental parameters associated with a PSU 110, including without limitation an input voltage to a PSU 110, an air pressure, and an air density.

In operation, to enable a user of information handling system 102 to understand how a deployed workload may fit within their chosen configuration of PSUs 110, power redundancy settings, and datacenter power infrastructure, management controller 106 may define a telemetry attribute indicative of a real-time quantized number of PSUs 110 required to satisfy the deployed workload while satisfying redundancy settings. Thus, the real-time PSU workload attribute may present an ongoing, real-time characterization of the user's workload in units of PSUs 110. Such real-time PSU workload attribute may allow a user to track how a workload fits within the configuration of PSUs 110 over time.

To illustrate, management controller 106 (e.g., via a co-processor integral to management controller 106) may determine (e.g., from telemetry data communication from PSUs 110 and/or from appropriate sensors located within information handling system 102) the combined direct current (DC) power output from power trains 114 of PSUs 110. This combined DC power output may represent a workload of PSUs 110, and management controller 106 may divide this workload by the effective output DC power capacity of each PSU 110. The result of such calculation (which management controller 106 may round up to the nearest integer number in some embodiments) is the real-time PSU workload attribute representing a minimum number of PSUs needed to support power consumption of the components of information handling system 102 over time with the given workload.

Knowledge of the real-time PSU workload attribute may provide significant value and insight into information handling system 102. For example, the real-time PSU workload attribute may represent DC power consumption of information handling system 102 in units of PSUs 110 versus telemetry of existing approaches that reports alternating current (AC) power consumption consumed from a power grid in terms of watts.

As another example advantage, calculation of the real-time PSU workload attribute may use an effective output capacity of PSUs 110 rather than the typical PSU "name plate" output capacity order to account for line input voltage differences for dual-range PSUs. Stated another way, an effective output capacity of each PSU 110 may be specifically used in the calculation of the real-time PSU workload attribute because it incorporates an input voltage of the PSU (e.g., high-line or low-line) which may have a direct impact on the output capability of a dual-range PSU in a deployed environment. Effective output capacity may be differentiated from the more widely used PSU attribute called the nameplate or rated capacity which defines the max or nominal output capacity of the PSU. The nameplate capacity attribute is often used for almost all of the features in a system that depend on the PSU rated output. However, in the present disclosure, the effective output capacity attribute may be used because it incorporates the power delivery infrastructure of the datacenter and is more representative of the real-time capabilities of a PSU 110.

As a further example advantage, the determination of the real-time PSU workload attribute may be performed by management controller 106, which may implement the fastest power control loop in information handling system 102. Such fast acquisition of power consumption telemetry may enable management controller 106 to calculate the real-time PSU workload attribute and communicate such information to a user with the quality required to enable actionable decisions by the user.

FIG. 2 illustrates a flow chart of an example method 200 for determination of real-time redundancy based on workload, in accordance with embodiments of the present disclosure. According to certain embodiments, method 200 may begin at step 202. As noted above, teachings of the present disclosure may be implemented in a variety of configurations of information handling system 102. As such, the preferred initialization point for method 200 and the order of the steps comprising method 200 may depend on the implementation chosen.

At step 202, management controller 106 may monitor DC power consumption of information handling system 102. At step 204, management controller 106 may determine the effective output capacity of each PSU 110. At step 206, management controller 106 may calculate the real-time PSU workload attribute as the DC power consumption of information handling system 102 divided by the effective output capacity of each PSU 110, and round such quotient up to the nearest integer value.

At step 208, management controller 106 may determine whether the number of healthy PSUs 110 is sufficient to meet the real-time PSU workload attribute in accordance with the PSU redundancy policy of information handling system 102. For example, if a user of information handling system 102 has set the redundancy policy to a "grid redundant" policy, then management controller 106 may determine the redundancy policy satisfied if a number of healthy PSUs 110 on each redundant grid of information handling system 102 equals or exceeds the real-time PSU workload attribute. As another example, if a user of information handling system 102 has set the redundancy policy to a "PSU redundant" policy, then management controller 106 may determine the redundancy policy satisfied if a number of healthy PSUs 110 within information handling system 102 exceeds the real-time PSU workload attribute. If the number of healthy PSUs 110 is sufficient to meet the real-time PSU workload attribute in accordance with the PSU redundancy policy of information handling system 102, method 200 may proceed to step 210. Otherwise, method 200 may proceed to step 212.

At step 210, responsive to the number of healthy PSUs 110 being sufficient to meet the real-time PSU workload attribute in accordance with the PSU redundancy policy of information handling system 102, management controller 106 may set a real-time redundancy health variable to indicate healthy redundancy in information handling system 102. After completion of step 210, method 200 may proceed again to step 202.

At step 212, responsive to the number of healthy PSUs 110 being insufficient to meet the real-time PSU workload attribute in accordance with the PSU redundancy policy of information handling system 102, management controller 106 may set a real-time redundancy health variable to indicate unhealthy redundancy in information handling system 102. After completion of step 212, method 200 may proceed again to step 202.

Although FIG. 2 discloses a particular number of steps to be taken with respect to method 200, method 200 may be executed with greater or fewer steps than those depicted in FIG. 2. In addition, although FIG. 2 discloses a certain order of steps to be taken with respect to method 200, the steps comprising method 200 may be completed in any suitable order.

Method 200 may be implemented using information handling system 102, components thereof or any other system operable to implement method 200. In certain embodiments, method 200 may be implemented partially or fully in software and/or firmware embodied in computer-readable media.

Furthermore, in operation, management controller 106 may also use a comparison of historical data of quantized PSUs 110 versus the power architecture of the deployment (circuit breaker, power distribution units, and PSUs 110) to allow a customer to easily identify the severity of a PSU fault scenario. An additional use of the quantized PSU telemetry may enable the information handling system 102 to avoid logging a message about the loss of PSU redundancy in a fault condition when the workload does not warrant a critical log entry.

To illustrate, under existing approaches, it is common that a user may be provided with two messages when there is a single PSU 110 failure: "PSU00003 power supply X is lost" and "RDU0012 redundancy is lost." Both of these messages may be listed as critical errors to the user.

The "RDU0012 redundancy is lost error" may be triggered by a power budget calculation that does not take into account the actual power consumption or user workload of information handling system. However, in accordance with the present disclosure, management controller 106 may suppress a "RDU0012 redundancy is lost message" in response to a PSU 110 failure if PSU redundancy for the actual real-time workload remains with the remaining healthy PSUs 110, as may be indicated by the real-time PSU workload attribute.

In operation, management controller 106 may suppress such log message until the actual real-time workload of information handling system 102 increases to a point where the value of 110, as may be indicated by the real-time PSU workload attribute, would trigger a redundancy loss message. Thus, the log message could be completely avoided if an action returns the power budget-based redundancy sensor to a healthy state and the system workload stays redundant within the healthy PSUs.

FIG. 3 illustrates a flow chart of an example method 300 for critical log suppression, in accordance with embodiments of the present disclosure. According to certain embodiments, method 300 may begin at step 301. As noted above, teachings of the present disclosure may be implemented in a variety of configurations of information handling system 102. As such, the preferred initialization point for method 300 and the order of the steps comprising method 300 may depend on the implementation chosen.

At step 301, management controller 106 may set real-time redundancy health variable to indicate healthy redundancy.

At step 302, management controller 106 may determine if a PSU 110 has been added (e.g., inserted into information handling system 102 or begins supplying power) or removed (e.g., removed from information handling system 102 or ceases supplying power). If a PSU 110 has been added or removed, method 300 may proceed to step 306. Otherwise, method 300 may proceed to step 304.

At step 304, management controller 106 may determine if the real-time redundancy health variable transitioned (e.g., from healthy to unhealthy or vice versa). If the real-time redundancy health variable did not transition, method 300 may proceed again to step 302. Otherwise, if the real-time redundancy health variable transitioned, method 300 may proceed to step 312.

At step 306, management controller 106 may determine if a power budget redundancy sensor, such as that used in existing approaches to power management, has transitioned. If the power budget redundancy sensor has not transitioned, method 300 may proceed to step 302. Otherwise, if the power budget redundancy sensor has transitioned, method 300 may proceed to step 308.

At step 308, management controller 106 may determine if the power budget redundancy sensor is set to indicate healthy redundancy. If the power budget redundancy sensor is set to indicate healthy redundancy, method 300 may proceed to step 310. Otherwise, if the power budget redundancy variable is set to indicate unhealthy redundancy, method 300 may proceed to step 312.

At step 310, management controller 106 may issue a log message to indicate that PSUs 110 are redundant. After completion of step 310, method 300 may proceed again to step 302.

At step 312, management controller 106 may determine if the real-time redundancy health variable is set to indicate healthy redundancy. If the real-time redundancy health variable is set to indicate healthy redundancy, method 300 may proceed again to step 302. Otherwise, if the real-time redundancy health variable is set to indicate unhealthy redundancy, method 200 may proceed to step 314.

At step 314, management controller 106 may issue a log message to indicate that PSUs 110 have lost redundancy. After completion of 314, method 300 may proceed again to step 302.

Although FIG. 3 discloses a particular number of steps to be taken with respect to method 300, method 300 may be executed with greater or fewer steps than those depicted in FIG. 3. In addition, although FIG. 3 discloses a certain order of steps to be taken with respect to method 300, the steps comprising method 300 may be completed in any suitable order.

Method 300 may be implemented using information handling system 102, components thereof or any other system operable to implement method 300. In certain embodiments, method 300 may be implemented partially or fully in software and/or firmware embodied in computer-readable media.

In accordance with method 300, management controller 106 may suppress issuance of log messages of lost power supply redundancy due to power budget redundancy becoming unhealthy (as is the case in existing approaches), and only allow issuance of such log messages if the real-time redundancy health variable is unhealthy.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. An information handling system comprising:
   a power system comprising a plurality of power supply units; and
   a management controller communicatively coupled to the plurality of power supply units and configured to:
   monitor real-time direct current (DC) power consumption by components of the information handling system;
   determine an effective output capacity of each of the plurality of power supply units;
   based on the real-time DC power consumption and effective output capacity of each of the plurality of power supply units, determine a real-time power supply unit workload attribute that indicates a number of the plurality of power supply units required to provide the real-time DC power consumption; and
   based on a redundancy policy of the information handling system, determine whether a number of healthy power supply units is sufficient to satisfy the real-time power supply unit workload attribute, wherein the redundancy policy comprises a grid redundant policy under which the number of healthy power supply units is sufficient when the number of healthy power supply units on each of a plurality of redundant power grids equals or exceeds the real-time power supply unit workload attribute.

2. The information handling system of claim 1, wherein the management controller is configured to set a real-time redundancy health variable to indicate healthy redundancy of the information handling system when the number of healthy power supply units of the plurality of power supply units is sufficient to satisfy the real-time power supply unit workload attribute.

3. The information handling system of claim 2, wherein the management controller is configured to set the real-time redundancy health variable to indicate unhealthy redundancy of the information handling system when the number of healthy power supply units of the plurality of power supply units is insufficient to satisfy the real-time power supply unit workload attribute.

4. The information handling system of claim 2, wherein the management controller is configured to suppress an alert indicative of loss of power supply redundancy due to failure of one of the plurality of power supply units when the real-time redundancy health variable indicates healthy redundancy of the information handling system even with the failure of the one of the plurality of power supply units.

5. A method comprising:
   monitoring real-time direct current (DC) power consumption by components of an information handling system;
   determining an effective output capacity of each of a plurality of power supply units of the information handling system;
   based on the real-time DC power consumption and effective output capacity of each of the plurality of power supply units, determining a real-time power supply unit workload attribute that indicates a number of the plurality of power supply units required to provide the real-time DC power consumption; and
   determine whether a number of healthy power supply units is sufficient to satisfy the real-time power supply unit workload attribute in accordance with a redundancy policy of the information handling system, wherein the redundancy policy comprises a grid redundant policy under which the number of healthy power supply units is sufficient when the number of healthy power supply units on each of a plurality of redundant power grids equals or exceeds the real-time power supply unit workload attribute.

6. The method of claim 5, further comprising setting a real-time redundancy health variable to indicate healthy redundancy of the information handling system when the number of healthy power supply units of the plurality of power supply units is sufficient to satisfy the real-time power supply unit workload attribute.

7. The method of claim 6, further comprising setting the real-time redundancy health variable to indicate unhealthy redundancy of the information handling system when the number of healthy power supply units of the plurality of power supply units is insufficient to satisfy the real-time power supply unit workload attribute.

8. The method of claim 6, further comprising suppressing an alert indicative of loss of power supply redundancy due to failure of one of the plurality of power supply units when the real-time redundancy health variable indicates healthy redundancy of the information handling system even with the failure of the one of the plurality of power supply units.

9. An article of manufacture comprising:
- a non-transitory computer-readable medium; and
- computer-executable instructions carried on the computer-readable medium, the instructions readable by a processor, the instructions, when read and executed, for causing the processor to:
  - monitor real-time direct current (DC) power consumption by components of an information handling system;
  - determine an effective output capacity of each of a plurality of power supply units of the information handling system;
  - based on the real-time DC power consumption and effective output capacity of each of the plurality of power supply units, determine a real-time power supply unit workload attribute that indicates a number of the plurality of power supply units required to provide the real-time DC power consumption; and
  - based on a redundancy policy of the information handling system, determine whether a number of healthy power supply units is sufficient to satisfy the real-time power supply unit workload attribute, wherein the redundancy policy comprises a grid redundant policy under which the number of healthy power supply units is sufficient when the number of healthy power supply units on each of a plurality of redundant power grids equals or exceeds the real-time power supply unit workload attribute.

10. The article of claim 9, the instructions for further causing the processor to set a real-time redundancy health variable to indicate healthy redundancy of the information handling system when the number of healthy power supply units of the plurality of power supply units is sufficient to satisfy the real-time power supply unit workload attribute.

11. The article of claim 10, the instructions for further causing the processor to set the real-time redundancy health variable to indicate unhealthy redundancy of the information handling system when the number of healthy power supply units of the plurality of power supply units is insufficient to satisfy the real-time power supply unit workload attribute.

12. The article of claim 10, the instructions for further causing the processor to suppress an alert indicative of loss of power supply redundancy due to failure of one of the plurality of power supply units when the real-time redundancy health variable indicates healthy redundancy of the information handling system even with the failure of the one of the plurality of power supply units.

* * * * *